US010454303B2

(12) United States Patent
Kim et al.

(10) Patent No.: US 10,454,303 B2
(45) Date of Patent: Oct. 22, 2019

(54) NON-CONTACT POWER SUPPLY DEVICE AND NON-CONTACT POWER SUPPLY METHOD

(71) Applicant: WITS Co., Ltd., Yongin-si, Gyeonggi-do (KR)

(72) Inventors: Si Hyung Kim, Suwon (KR); Soon Tack Oh, Suwon (KR); Hyun Keun Lim, Suwon (KR); Sung Uk Lee, Suwon (KR); Ki Won Chang, Suwon (KR); Chul Gyun Park, Suwon (KR); Jae Suk Sung, Suwon (KR); Chang Soo Kang, Suwon (KR)

(73) Assignee: WITS Co., Ltd., Gyeonggi-do (KR)

( * ) Notice: Subject to any disclaimer, the term of this patent is extended or adjusted under 35 U.S.C. 154(b) by 634 days.

(21) Appl. No.: 14/547,449

(22) Filed: Nov. 19, 2014

(65) Prior Publication Data

US 2015/0137748 A1 May 21, 2015

(30) Foreign Application Priority Data

Nov. 20, 2013 (KR) ........................ 10-2013-0141740
Jun. 25, 2014 (KR) ........................ 10-2014-0078486
Jul. 29, 2014 (KR) ........................ 10-2014-0096825
Nov. 6, 2014 (KR) ........................ 10-2014-0153387

(51) Int. Cl.
*H02J 50/10* (2016.01)
*H02J 5/00* (2016.01)
(Continued)

(52) U.S. Cl.
CPC .............. *H02J 50/10* (2016.02); *H02J 5/005* (2013.01); *H02J 7/025* (2013.01); *H02J 17/00* (2013.01);
(Continued)

(58) Field of Classification Search
CPC ............. H02J 7/025; H02J 5/005; H02J 50/10
(Continued)

(56) References Cited

U.S. PATENT DOCUMENTS

2010/0270867 A1 10/2010 Abe
2012/0040613 A1 2/2012 Nakano
(Continued)

FOREIGN PATENT DOCUMENTS

CN 103259340 A 8/2013
EP 2816706 A1 12/2014
(Continued)

OTHER PUBLICATIONS

Extended European Search Report dated May 15, 2015 in corresponding European Patent Application No. 14275240.1.
(Continued)

*Primary Examiner* — Richard V Muralidar
(74) *Attorney, Agent, or Firm* — Harness, Dickey & Pierce, P.L.C.

(57) ABSTRACT

There are provided a non-contact power supply device and a non-contact power supply method, in which a short beacon is transmitted to recognize a power receiving device, a long beacon is transmitted to wake-up a communications circuit of the power receiving device, and charging power is transmitted in a contactless manner, wherein at least one of signal levels of the short beacon and signal levels of the long beacon is varied.

35 Claims, 16 Drawing Sheets

(51) Int. Cl.

| | |
|---|---|
| ***H02J 50/90*** | (2016.01) |
| ***H02J 17/00*** | (2006.01) |
| ***H04B 5/00*** | (2006.01) |
| ***H02J 7/02*** | (2016.01) |
| *H02J 9/00* | (2006.01) |

(52) U.S. Cl.
CPC ............ *H02J 50/90* (2016.02); *H04B 5/0037* (2013.01); *H02J 9/005* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2012/0049644 | A1 | 3/2012 | Choi et al. | |
| 2012/0223589 | A1* | 9/2012 | Low | H04B 5/0037 307/104 |
| 2012/0311363 | A1 | 12/2012 | Kim et al. | |
| 2013/0154558 | A1 | 6/2013 | Lee et al. | |
| 2013/0214612 | A1 | 8/2013 | Bae | |

FOREIGN PATENT DOCUMENTS

| | | |
|---|---|---|
| KR | 10-2011-0009227 | 1/2011 |
| KR | 10-2012-0134029 | 12/2012 |
| WO | WO 2009/140217 A2 | 11/2009 |
| WO | WO 2013/121757 A1 | 8/2013 |

OTHER PUBLICATIONS

Chinese Office Action dated Jan. 23, 2018 in corresponding Chinese Patent Application No. 201410669963.0 (15 pages in English and 10 pages in Chinese).

* cited by examiner

NON-CONTACT POWER SUPPLY DEVICE AND NON-CONTACT POWER SUPPLY METHOD

CROSS-REFERENCE TO RELATED APPLICATIONS

This application claims the priority and benefit of Korean Patent Application Nos. 10-2013-0141740 filed on Nov. 20, 2013, 10-2014-0078486 filed on Jun. 25, 2014, 10-2014-0096825 filed on Jul. 29, 2014, and 10-2014-0153387 filed on Nov. 6, 2014, with the Korean Intellectual Property Office, the disclosures of which are incorporated herein by reference.

BACKGROUND

The present disclosure relates to a non-contact power supply device and a non-contact power supply method in which power is transmitted in a contactless manner.

In order to supply power to an electronic device, a power supply device for transferring power from an external power source to the electronic device is required.

In general, a wired power supply device, directly connected to an electronic device via a connector, or the like, to supply power to a battery included in the electronic device, is currently in widespread use. Alternatively, as disclosed in the following related art document, power may be supplied to the battery provided in the electronic device in a contactless manner through a magnetic induction effect or a magnetic resonance effect.

Meanwhile, as disclosed in the following related art document, a non-contact power supply device may transmit a short beacon to determine whether or not a power receiving device which receives power in a contactless manner is in proximity to a charging surface of the power supply device. Here, the non-contact power supply device may not properly recognize the power receiving device in the vicinity thereof, due to reliance on a coupling coefficient between a coil of the charging surface of the non-contact power supply device and a coil of the power receiving device. In addition, the non-contact power supply device may transmit a relatively long beacon to wake-up a communications circuit of the power receiving device so as to perform a normal charging operation. In such a case, the communications circuit of the power receiving device may not be woken-up, due to problems with the coupling coefficient between the coil of the charging surface and the coil of the power receiving device.

RELATED ART DOCUMENT

Patent Document (Patent Document 1) Korean Patent Laid-Open Publication No. 10-2011-0009227

SUMMARY

An aspect of the present disclosure may provide a non-contact power supply device and a non-contact power supply method in which signal levels of a short beacon or a long beacon are varied.

According to an aspect of the present disclosure, there may be provided a non-contact power supply device and a non-contact power supply method in which a short beacon is transmitted to recognize a power receiving device, a long beacon is transmitted to wake-up a communications circuit of the power receiving device, and charging power is transmitted in a contactless manner, wherein at least one of signal levels of the short beacon and signal levels of the long beacon is varied.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Figure 1A:
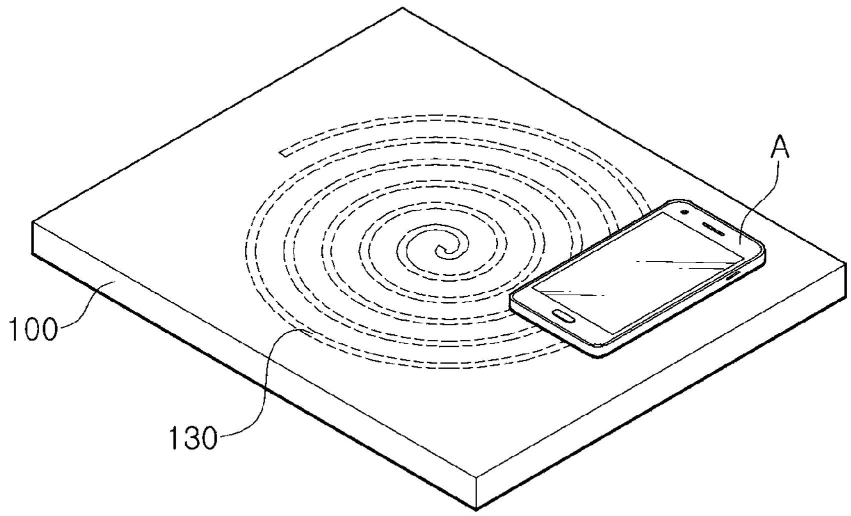
FIGS. 1A through 1C are exemplary diagrams illustrating a non-contact power supply device and a power receiving device.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1B:
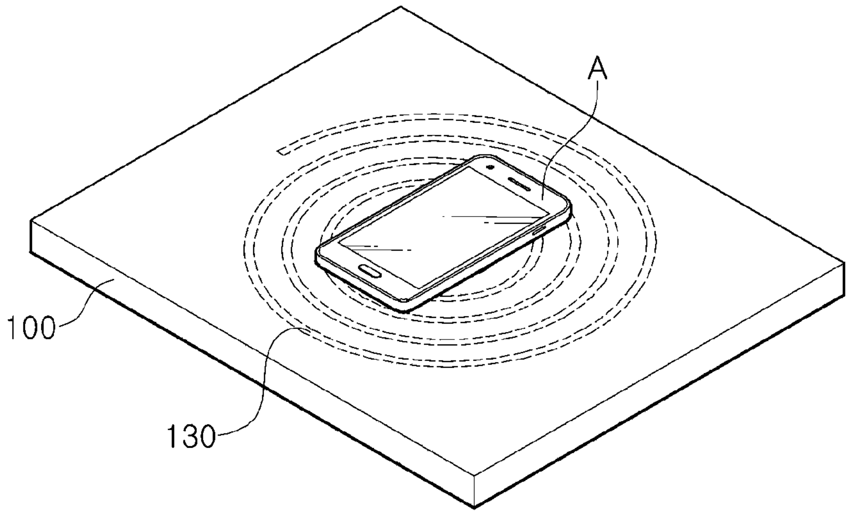
Figure 1C:
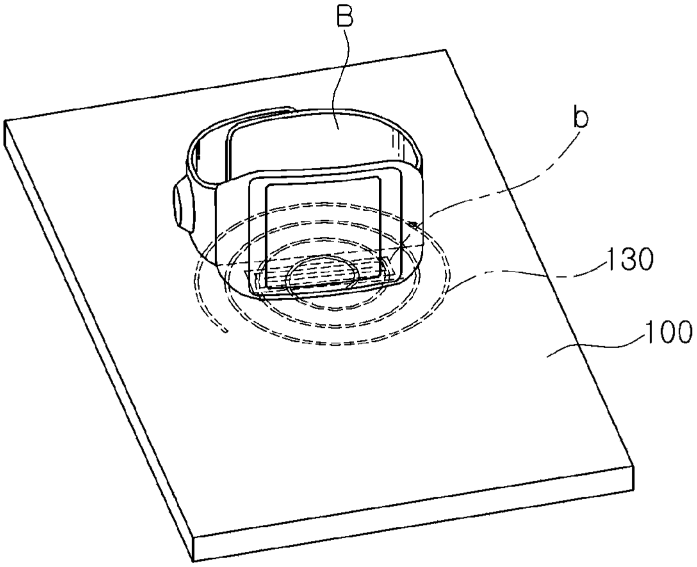

FIGS. 1A through 1C are diagrams illustrating a non-contact power supply device and a power receiving device.

Referring to FIG. 1A, a power supply device 100 according to an exemplary embodiment may transmit a short beacon, a long beacon, and charging power in a contactless manner (here, the contactless manner may refer to a process in which power is transmitted from a transmitting side to a receiving side without a direct connection between conductors of the transmitting side and the receiving side, in other words, via a non-contact transmission, a wireless transmission, or the like). The power supply device 100 according to an exemplary embodiment may transmit the short beacon, the long beacon, and the charging power through a power transmitting coil 130.

In a case in which a power receiving device A is in proximity to a surface of the power supply device 100, a coupling coefficient between a power receiving coil (not shown) of the power receiving device A and a power transmitting coil 130 may be reduced, as a distance of the power receiving device A from the center of the power transmitting coil 130 having a predetermined number of turns is increased, and thus, the power supply device 100 may not properly recognize the power receiving device A or may not wake up a communications circuit of the power receiving device A, even when the power supply device 100 transmits a short beacon or a long beacon having a predetermined signal level.

Referring to FIG. 1B, in a case in which the power receiving device A is positioned to be in proximity to the center of the power transmitting coil 130, the coupling coefficient between the power receiving coil (not shown) of the power receiving device A and the power transmitting coil 130 is relatively high, and thus, the power supply device 100 may recognize the power receiving device A or wake-up the communications circuit of the power receiving device A by using a short beacon or a long beacon having a low signal level. However, the transmission of a short beacon or a long beacon having a signal level equal to or higher than a predetermined signal level may result in unnecessary power consumption. Even in a case in which the power receiving device A is positioned to be in proximity to the center of the power transmitting coil 130, the coupling coefficient therebetween may be low due to a compatibility problem between the power receiving device A and the power supply device 100. This can be seen as a situation the equivalent of that of FIG. 1A.

Referring to FIG. 1C, in a case in which a power receiving device B is a wearable device such as a smartwatch, it has a relatively small power receiving coil b, and thus, the power supply device 100 may not properly recognize the power receiving device B even when the power receiving device B is positioned to be in proximity to the center of the power transmitting coil 130.

Figure 2A:
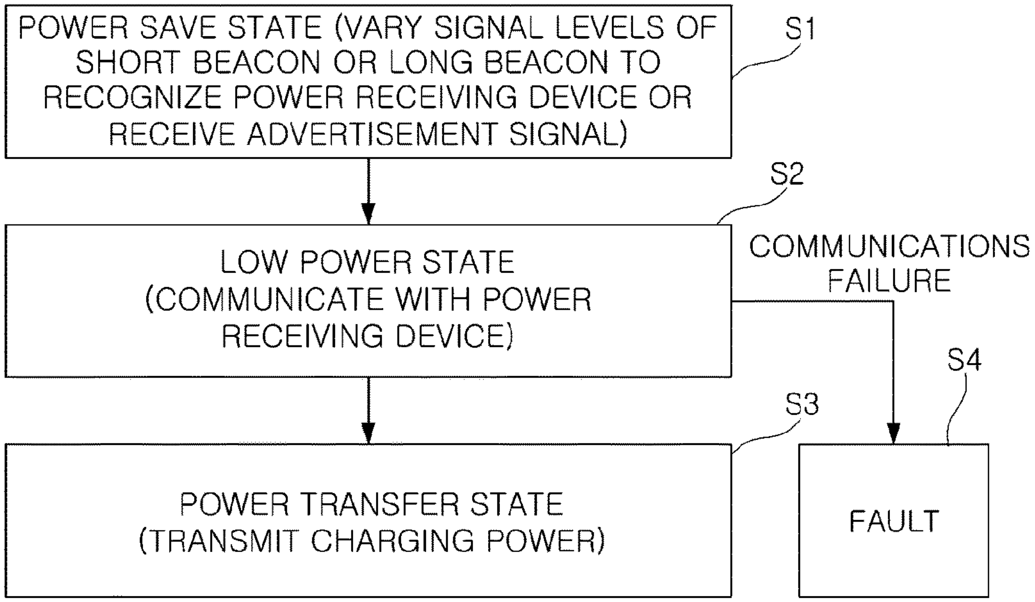
FIG. 2A is a flowchart illustrating an operation of a non-contact power supply device according to an exemplary embodiment in the present disclosure.
Figure 2B:
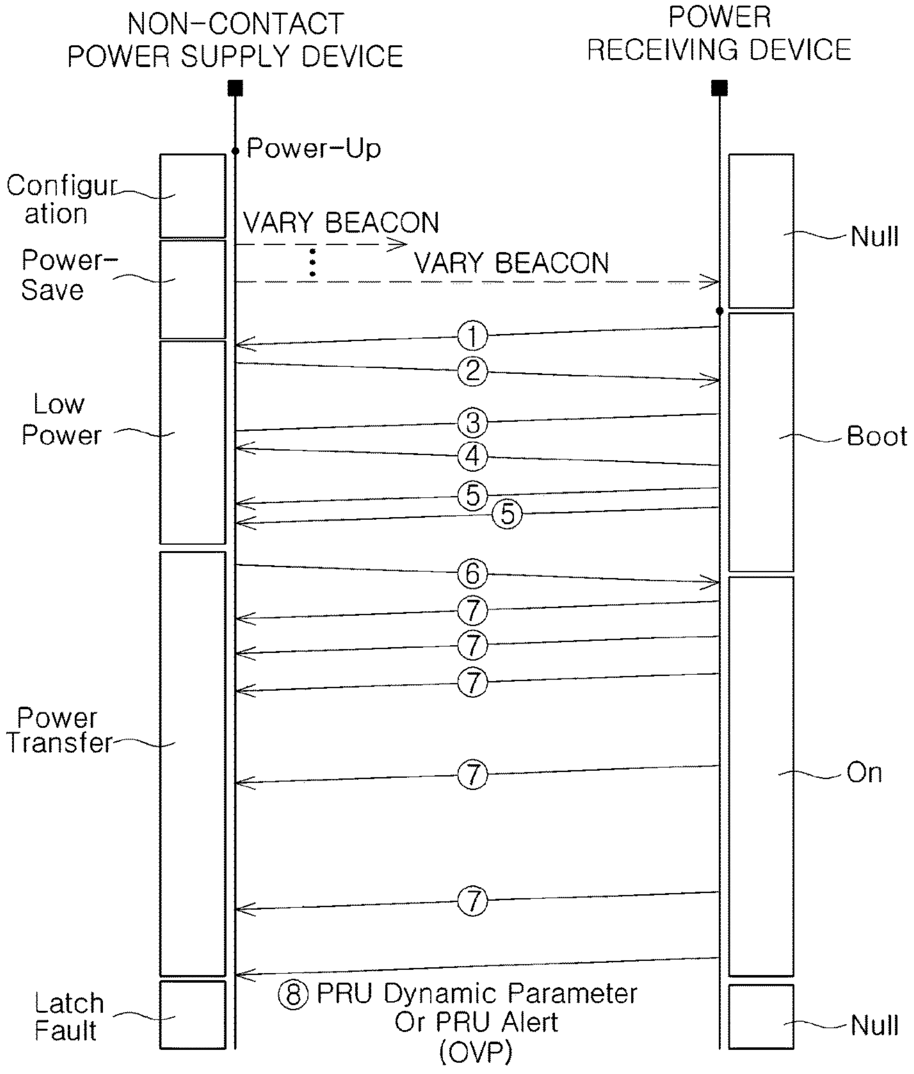
FIG. 2B is an exemplary diagram illustrating signal transmission and signal reception between the non-contact power supply device and the power receiving device, in the operation illustrated in FIG. 2A.

FIG. 2A is a flowchart illustrating an operating state of a non-contact power supply device according to an exemplary embodiment in the present disclosure, and FIG. 2B is a diagram illustrating signal transmission and signal reception between the non-contact power supply device and the power receiving device in the operating state of FIG. 2A.

Referring to FIGS. 2A and 2B, the operating states of the non-contact power supply device according to an exemplary embodiment may be classified as a power save state S1, a low power state S2, a power transfer state S3, and a fault state S4.

In the power save state S1, a short beacon may be broadcast to determine whether or not the power receiving device is in proximity to a power transmitting surface of the non-contact power supply device, and a long beacon may be broadcast to wake-up the communications circuit of the power receiving device.

In this case, the signal level of the short beacon or the long beacon may be varied.

The short beacon or the long beacon may be output from the power transmitting coil of the non-contact power supply device.

In the low power state S2, in a case in which the non-contact power supply device receives an advertisement signal (PRU advertisement indicated by reference numeral ①) from the power receiving device, the non-contact power supply device may transmit a connection request (connection request indicated by reference numeral ②) to the power receiving device, and a variety of parameters (PRU static parameter indicated by reference numeral ③, PTU static parameter indicated by reference numeral ④, and PRU dynamic parameter indicated by reference numeral ⑤) for transmitting charging power may be then transmitted between the non-contact power supply device and the power receiving device.

In a case in which the transmission of the parameters between the non-contact power supply device and the power receiving device is completed, the non-contact power supply device may enter the power transfer state S3. In a case in which the advertisement signal is only received from the power receiving device and the parameters are not transmitted or received, communications failure may be determined and the non-contact power supply device may enter the fault state S4, thereby stopping the operation.

In the power transfer state S3, the non-contact power supply device may request information regarding the charging power necessary for the power receiving device (PRU control indicated by reference numeral ⑥) and then transmit requested charging power to the power receiving device according to a charging power request or a charging power transmission stop request (PRU dynamic parameter indicated by reference numeral ⑦) from the power receiving device. If the charging power transmission stop request is made (reference numeral ⑧), the non-contact power supply device may enter the fault state S4, thereby stopping the operation.

The signal transmission and reception (reference numerals ① to ⑧) in the low power state S2 and the power transfer state S3 described above may be performed between the communications circuit of the non-contact power supply device and the communications circuit of the power receiving device, and the charging power may be transmitted between the power transmitting coil of the non-contact power supply device and the power receiving coil of the power receiving device.

FIGS. 3A through 3D are diagrams illustrating operations of a non-contact power supply device according to an exemplary embodiment in the present disclosure.

Figure 3A:
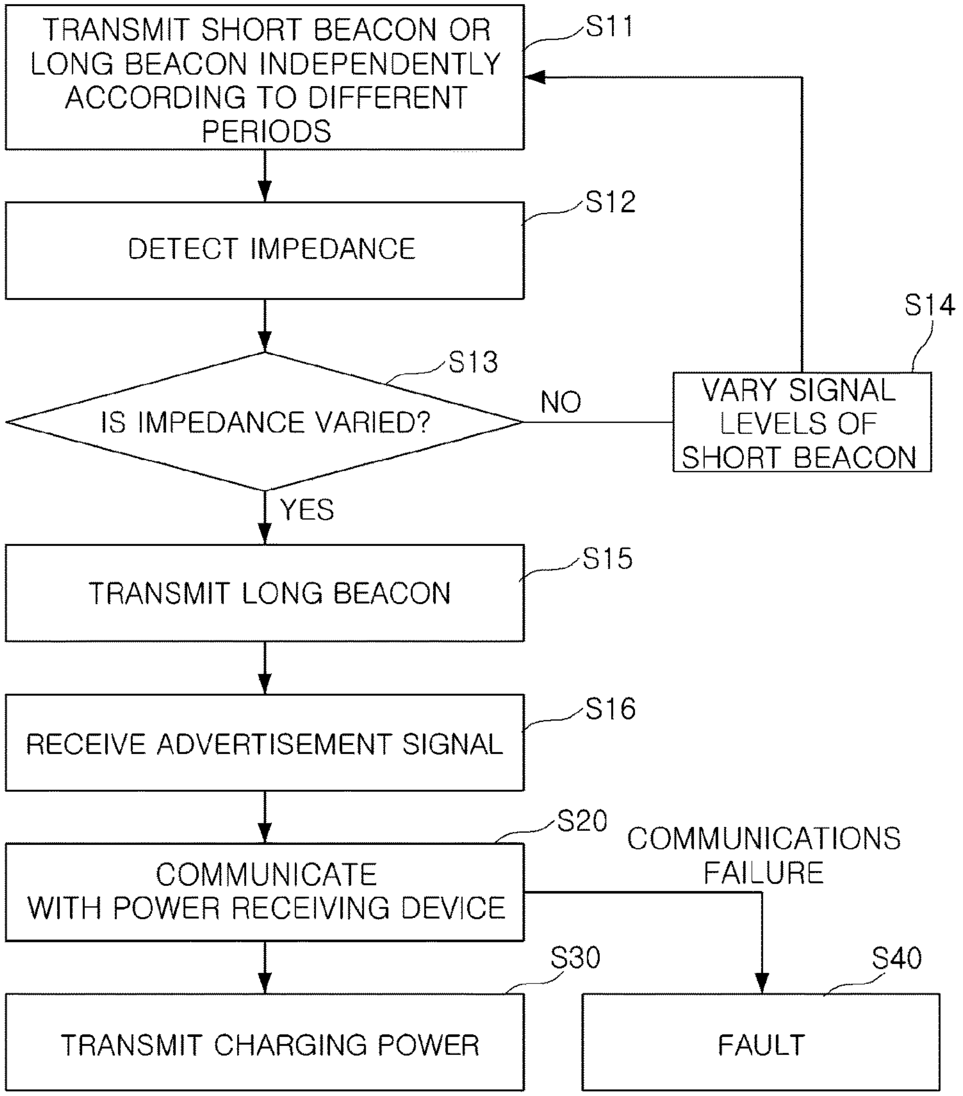
FIGS. 3A through 3D are diagrams illustrating operations of a non-contact power supply device according to an exemplary embodiment in the present disclosure.

Referring to FIG. 3A, a non-contact power supply device according to an exemplary embodiment may broadcast a short beacon (S11), may detect impedance of a power transmitting coil (S12), may broadcast a long beacon if the impedance is varied (S13, S15), and may vary a signal level of the short beacon if the impedance is not varied to thereby broadcast the short beacon (S14). The non-contact power supply device according to an exemplary embodiment may broadcast the short beacon according to a first period.

In the step S11, the non-contact power supply device according to an exemplary embodiment may broadcast the long beacon according to a second period different from the first period, additionally. In other word, a non-contact power supply device according to an exemplary embodiment may independently broadcast a short beacon and a long beacon according to predetermined periods differing from each other.

If a communications circuit of a power receiving device is woken-up by the transmitted long beacon and the non-contact power supply device receives an advertisement signal from the power receiving device (S16), the non-contact power supply device may communicate with the power receiving device (S20) and transmit necessary charging power (S30).

If the non-contact power supply device fails to communicate with the power receiving device, it may enter a fault state, thereby stopping the operation.

Figure 3B:
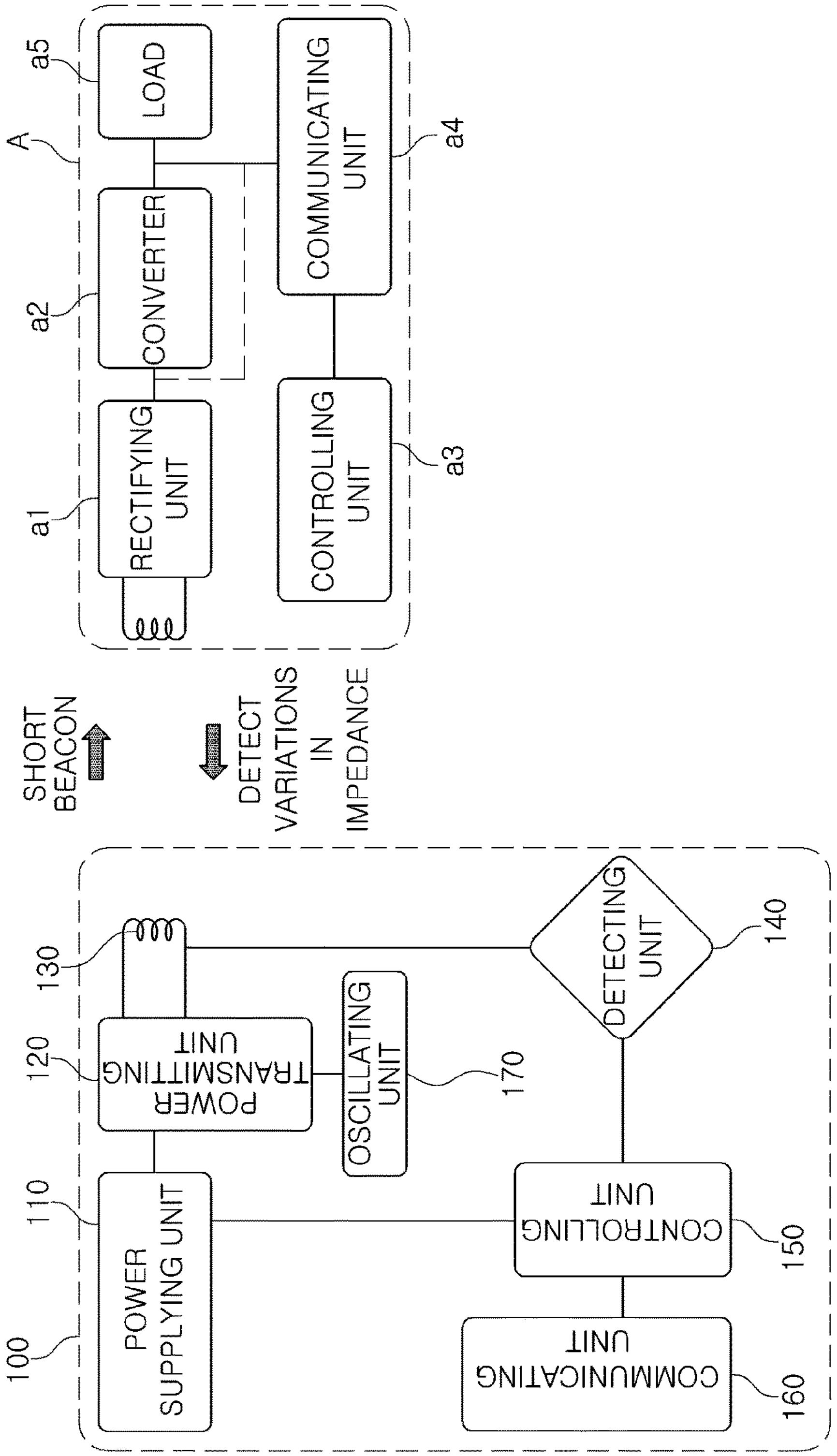
Figure 3C:
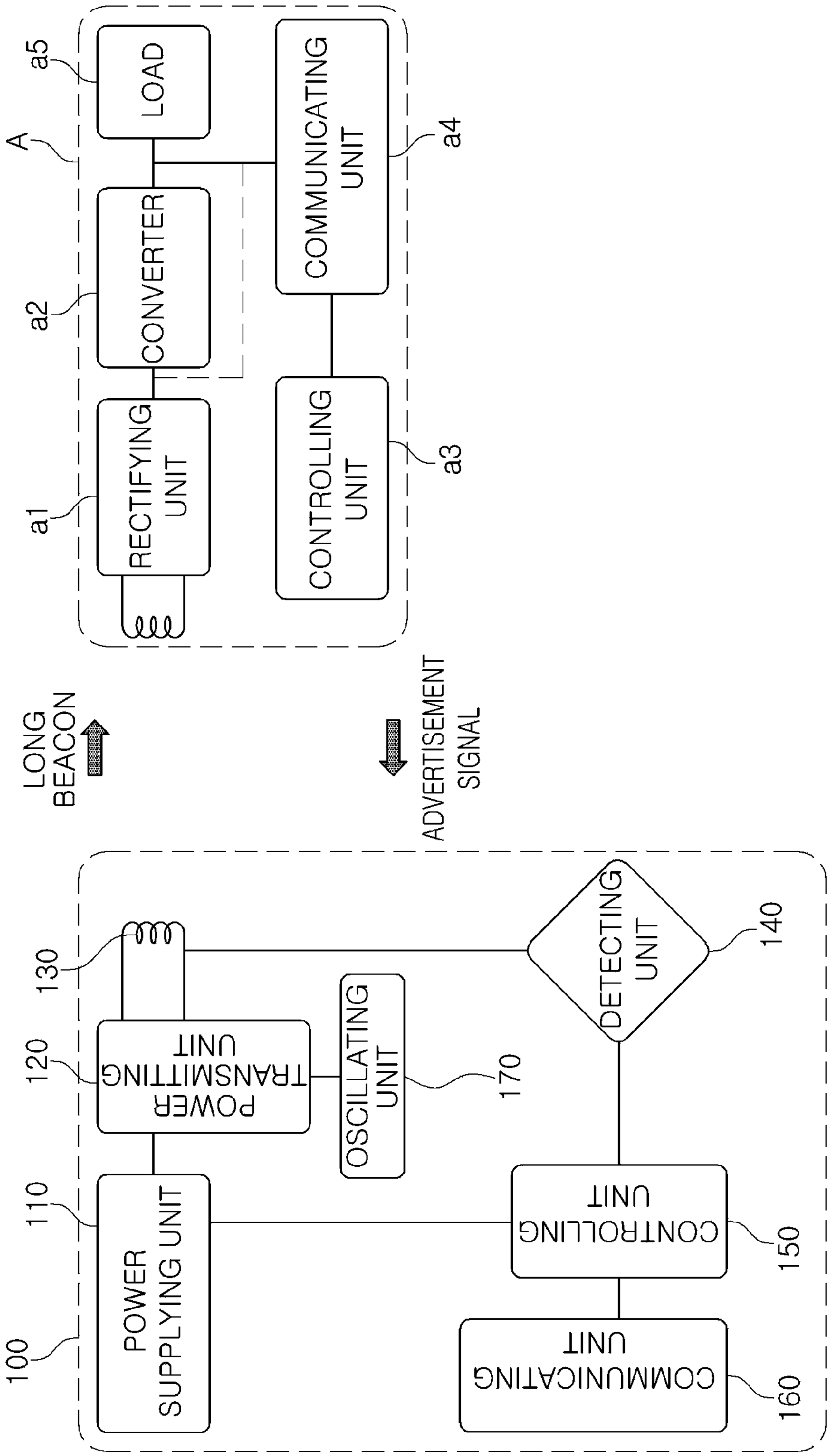

Referring to FIGS. 3B and 3C, the power supply device 100 according to an exemplary embodiment may include a power transmitting unit 120, a power transmitting coil 130, a detecting unit 140, and a controlling unit 150, and may further include a power supplying unit 110, an oscillating unit 170, and a communicating unit 160.

The power transmitting unit 120 may transmit a short beacon, a long beacon, and charging power through the power transmitting coil 130, and may vary the signal level of the short beacon or the signal level of the long beacon according to a control of the controlling unit 150 (variations in the signal level of the long beacon will be described below with reference to another exemplary embodiment).

Figure 3D:
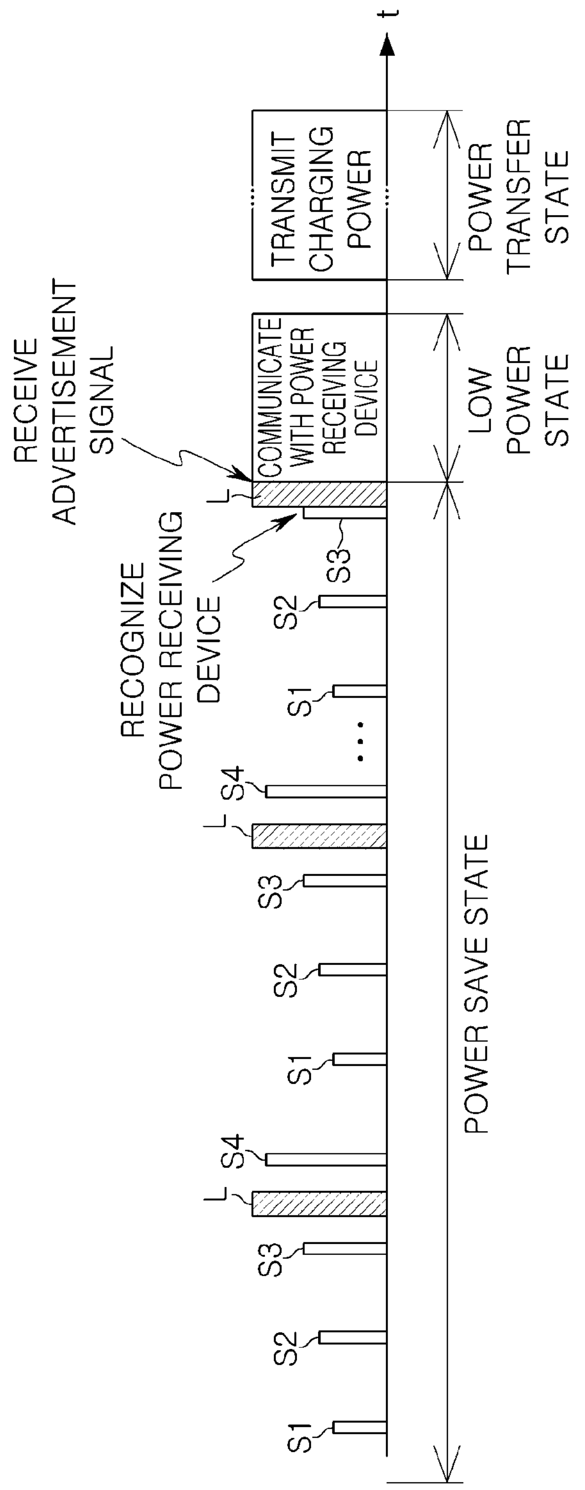

Meanwhile, FIG. 3D illustrates the operation of the non-contact power supply device according to an exemplary embodiment in more detail, which will be described with reference to FIGS. 3A through 3C.

The power supply device 100 according to an exemplary embodiment may broadcast a short beacon and a long beacon according to different periods through the power transmitting coil 130.

For example, the signal level of the short beacon may be varied, while the signal level of the long beacon may be fixed.

That is, the power transmitting unit 120 may transmit the short beacon through the power transmitting coil 130 according to a predetermined period in order to determine whether or not the power receiving device A is in proximity to the power supply device 100, and may transmit the long beacon according to a period different from the period of the short beacon in order to wake-up a communicating unit a4 of the power receiving device A.

In a case in which the short beacon is induced to the power receiving coil of the power receiving device A, impedance of the power transmitting coil 130 is varied. Therefore, the detecting unit 140 may detect whether the power receiving device A is in proximity to the power supply device 100 by detecting variations in impedance of the power transmitting coil 130 after the transmission of the short beacon. The detecting unit 140 may transmit the detected result to the controlling unit 150, and the controlling unit 150 may vary the signal level of the short beacon until the detected result from the detecting unit 140 corresponds to a state in which the power receiving device A is in proximity to the power supply device 100.

In this case, the controlling unit 150 may vary the signal level of the short beacon by varying a level of power supplied by the power supplying unit 110 to the power transmitting unit 120, and the power transmitting unit 120 may transmit the short beacon to the outside through the power transmitting coil 130 at a carrier frequency provided by the oscillating unit 170.

As illustrated, for example, in a case in which the signal levels of the short beacon are set to first to fourth levels s1, s2, s3, and s4, they may be sequentially varied so that the short beacon may have a first level s1, a second level s2, a third level s3, and a fourth level s4 in order. The short beacon may be transmitted according to a predetermined period as described above, and for example, in the case in which the signal levels of the short beacon are set to the first to fourth levels s1, s2, s3, and s4, they may be sequentially varied so that the short beacon may have the first level s1, the second level s2, the third level s3, and the fourth level s4 in order according to the predetermined period, may be transmitted in the order of the first level, the second level, the third level, and the fourth level, and then may be repetitively varied and transmitted in the order of the first level, the second level, the third level, and the fourth level.

The aforementioned signal levels may be varied from a minimum level to a maximum level among the set levels, but may be sequentially varied from a level corresponding to a level when the power receiving device has previously been recognized, in some cases. That is, in a case in which the power receiving device has previously been recognized at the second level, the levels may be repetitively varied and transmitted from the second level to the fourth level, and after the levels are varied from the second level to the fourth level, the levels may be varied and transmitted from the first level to the fourth level.

Meanwhile, as described above, a long beacon may be transmitted according to a predetermined period different from that of the short beacon. Here, if the impedance of the power transmitting coil 130 is varied after the transmission of the short beacon and it is determined that the power receiving device A is in proximity to the power supply device 100, a long beacon may be transmitted independently of the predetermined period, but it may not be transmitted at a timing at which the long beacon having the predetermined period should be transmitted.

For example, if the short beacon having the third level is transmitted and it is determined that the power receiving device A is in proximity to the power supply device 100, the long beacon may be transmitted independently regardless of the predetermined period.

The transmitted long beacon may be rectified by a rectifying unit a1 of the power receiving device A, may be converted into power having an appropriate level by a converter a2, and then may be transferred to a communicating unit a4 to thereby wake-up the communicating unit a4. Then, the controlling unit a3 may transmit the advertisement signal through the communicating unit a4, and if the communicating unit 160 receives the advertisement signal from the power receiving device A, it may communicate with the communicating unit a4 of the power receiving device A, and the controlling unit 150 may control operations of the power supplying unit 110 and the power transmitting unit 120 to transmit necessary charging power.

If the communicating unit 160 fails to communicate with the power receiving device A after receiving the advertisement signal, the power supply device may enter the fault state after the signal transmitting operation in the low power state is repeated three times, and then stop the operation.

FIGS. 4A through 4D are diagrams illustrating operations of a non-contact power supply device according to another exemplary embodiment in the present disclosure.

Figure 4A:
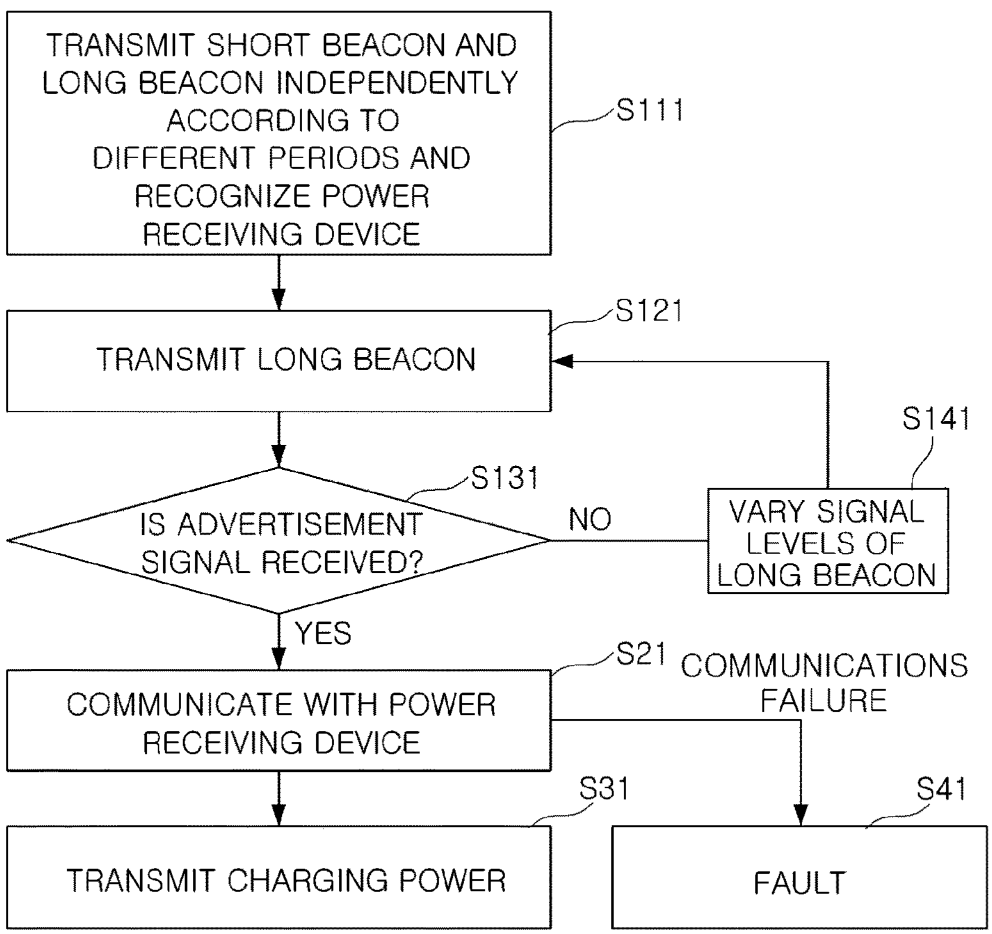
FIGS. 4A through 4D are diagrams illustrating operations of a non-contact power supply device according to another exemplary embodiment in the present disclosure.

Referring to FIG. 4A, if a short beacon is transmitted and it is then determined that the power receiving device is in proximity to the power supply device (S111), the signal level of a long beacon which is transmitted independently of a predetermined period may be varied (S121, S131, S141).

Next, if an advertisement signal is received from the power receiving device, the power supply device may communicate with the power receiving device (S21) and then transmit charging power (S31), and if the power supply device fails to communicate with the power receiving device, the power supply device may enter a fault state (S41).

More particularly, the non-contact power supply device according to an exemplary embodiment may transmit the long beacon prior to a timing at which the long beacon having the predetermined period is to be transmitted in order to wake-up the communications circuit of the power receiving device when, by broadcasting the short beacon, the impedance of the power transmitting coil is varied to a preset level or more.

In this case, if the advertisement signal is not received from the communications circuit of the power receiving device by the long beacon having a predetermined level, the signal level of the long beacon may be varied.

Figure 4B:
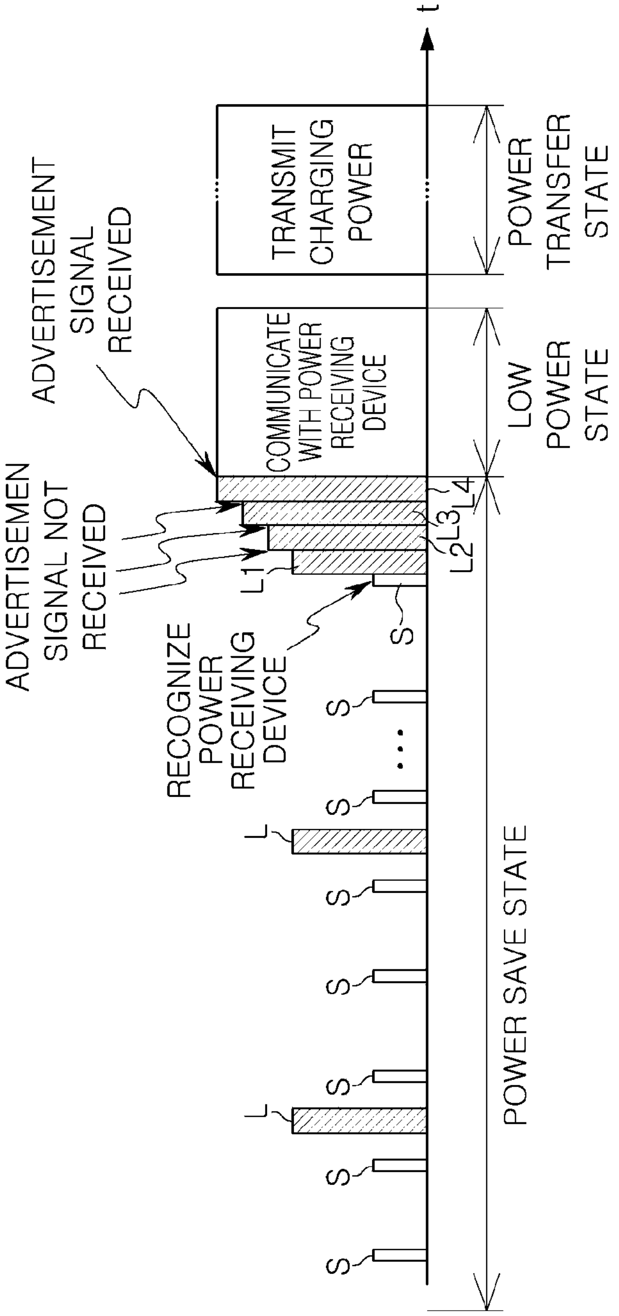

For example, as illustrated in FIG. 4B, in a case in which the signal levels of the aforementioned long beacon are set to first to fourth levels (L1, L2, L3, L4), the signal levels of the long beacon may be sequentially increased from a first level L1 to a fourth level L4. In some cases, the signal levels may be sequentially increased within a set time from a level corresponding to a level when the advertisement signal has previously been received from the power receiving device to a maximum level.

The signal levels of the long beacon may be continuously varied as illustrated, without a predetermined time interval.

Figure 4C:
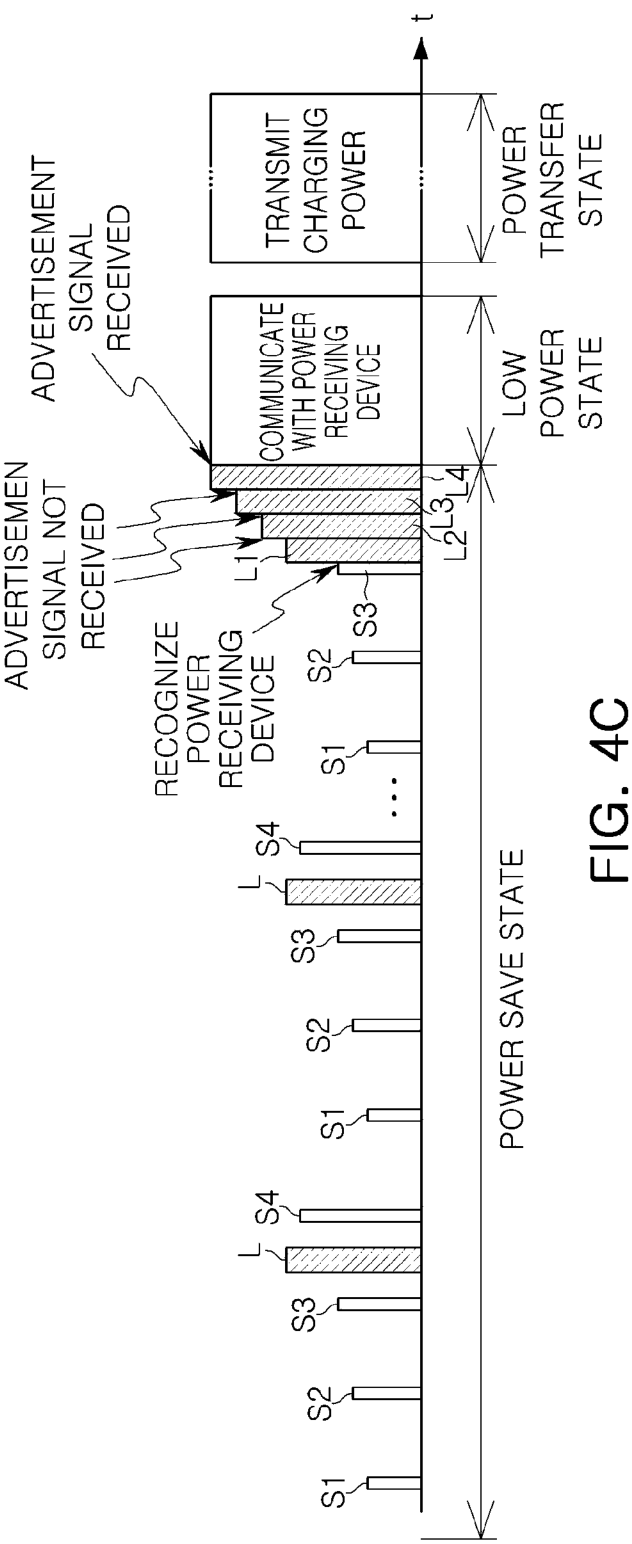

Meanwhile, in exemplary embodiments, the signal levels of the short beacon may be fixed as illustrated in FIG. 4B or may be varied as illustrated in FIG. 4C.

Figure 4D:
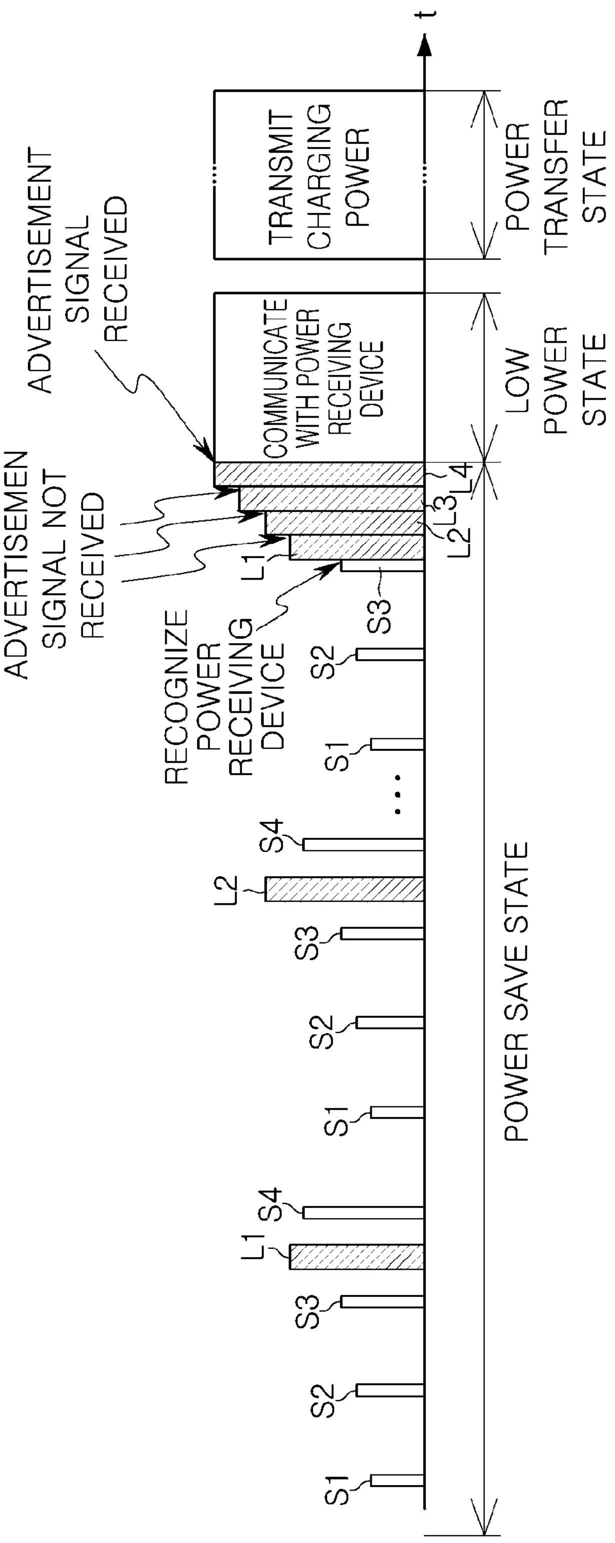

In exemplary embodiments, the signal levels of the long beacon having the predetermined period may be fixed as illustrated in FIGS. 4B and 4C, or may be varied as illustrated in FIG. 4D.

Figure 5A:
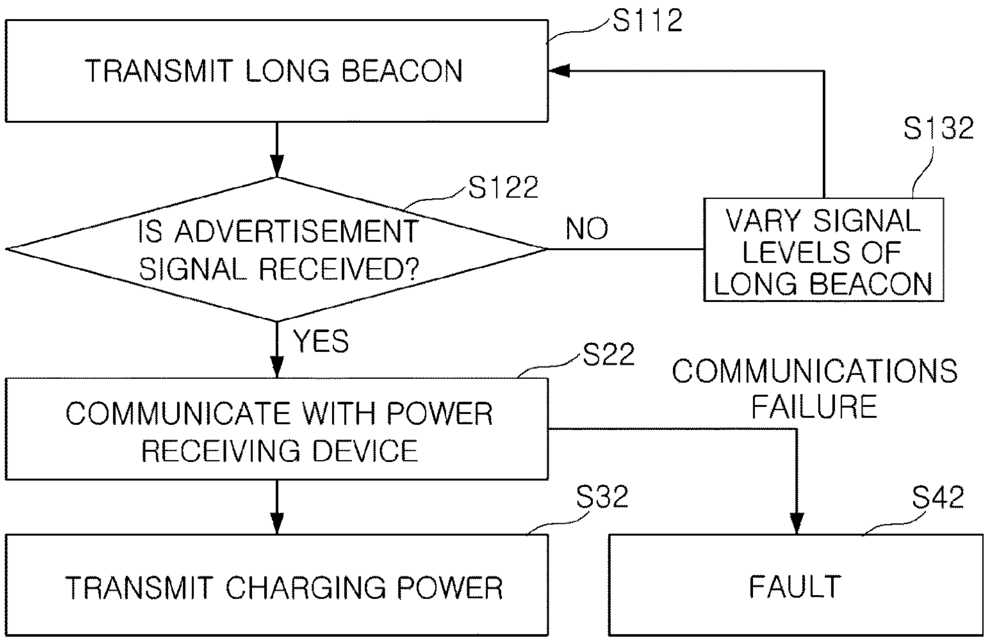
FIGS. 5A through 5C are diagrams illustrating operations of a non-contact power supply device according to another exemplary embodiment in the present disclosure.
Figure 5B:
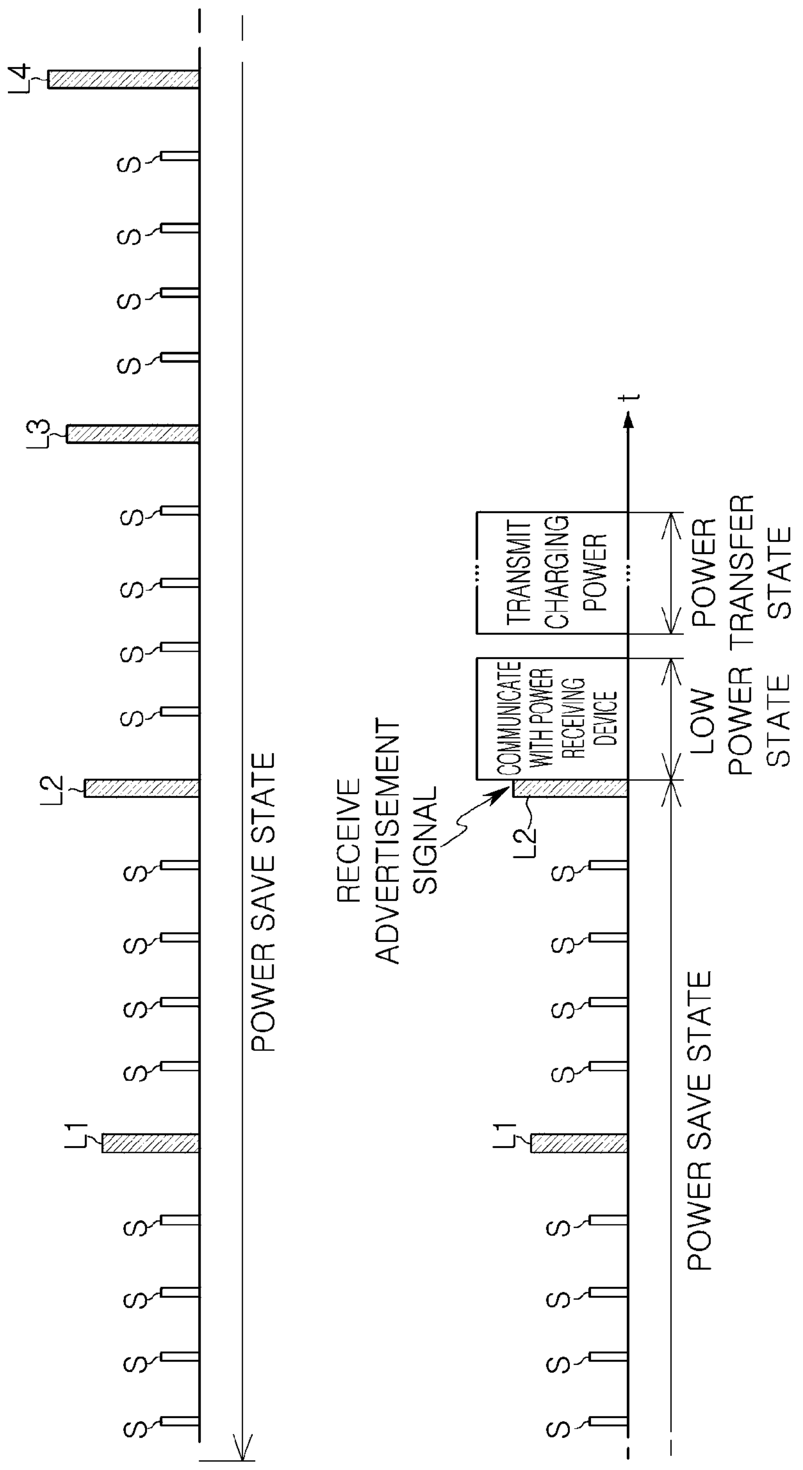
Figure 5C:
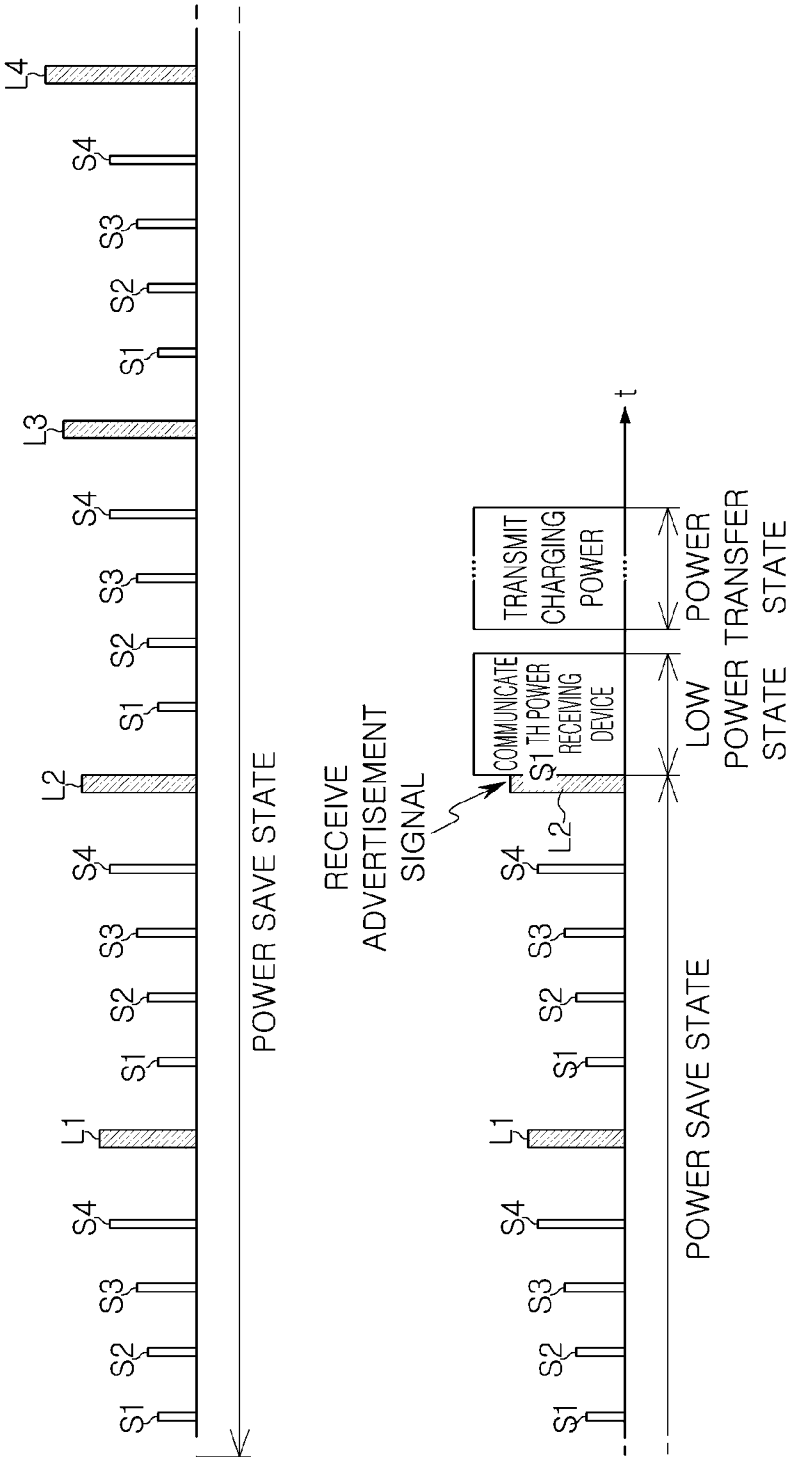

FIGS. 5A through 5C are diagrams illustrating operations of a non-contact power supply device according to another exemplary embodiment in the present disclosure.

Referring to FIG. 5A, even in a case in which a short beacon is transmitted, the power receiving device may not be recognized. That is, in a case in which the size of the power receiving coil such as a power receiving coil included in a wearable device as illustrated in FIG. 1C, is relatively small, variations in impedance of the power receiving coil is small even when the power receiving device is accurately positioned at the center of the power transmitting surface, and thus, the power receiving device may not be recognized.

In this case, regardless of a recognition fail of the power receiving device by the short beacon (although the transmission of the short beacon is omitted in the drawing, the short beacon may be transmitted according to a predetermined period in actual operation), if the communications circuit of the power receiving device is woken-up by a long beacon which is transmitted according to a predetermined period and an advertisement signal is received (S112, S122, S132), the power supply device may communicate with the power receiving device (S22) and then transmit charging power (S32). Similarly, if the power supply device fails to communicate with the power receiving device, it may enter a fault state (S42).

For example, the signal levels of the long beacon which is transmitted according to the predetermined period may be varied depending on whether or not the advertisement signal has been received.

As illustrated in FIGS. 5B and 5C, if the power receiving device is not recognized due to small variations in impedance even when the signal levels of the short beacon are fixed or varied, the signal levels of the long beacon which is transmitted according to the predetermined period may be varied depending on whether or not the advertisement signal has been received. If the advertisement signal is received from the communications circuit of the power receiving device, the power supply device may communicate with the power receiving device and then transmit charging power. The signal levels of the long beacon may be sequentially varied from a minimum level to a maximum level among the set signal levels as illustrated in FIG. 4B, and may be sequentially varied from a level corresponding to a level when the advertisement signal has previously been received from the power receiving device to the maximum level, in some cases.

For example, in the case in which the signal levels of the long beacon are set to the first to fourth levels L1, L2, L3, and L4, they may be sequentially varied so that the long beacon may have the first level L1, the second level L2, the third level L3, and the fourth level L4 according to the predetermined period, may be transmitted in the order of the first level, the second level, the third level, and the fourth level, and then may be repetitively varied and transmitted in the order of the first level, the second level, the third level, and the fourth level.

The aforementioned signal levels may be varied from the minimum level to the maximum level among the set levels, but may be sequentially varied from a level corresponding to a level when the advertisement signal has previously been received, in some cases. That is, in the case in which the advertisement signal has previously been received at the second level, the levels may be repetitively varied and transmitted from the second level to the fourth level, and after the levels are varied from the second level to the fourth level, the levels may be varied and transmitted from the first level to the fourth level.

Figure 6A:
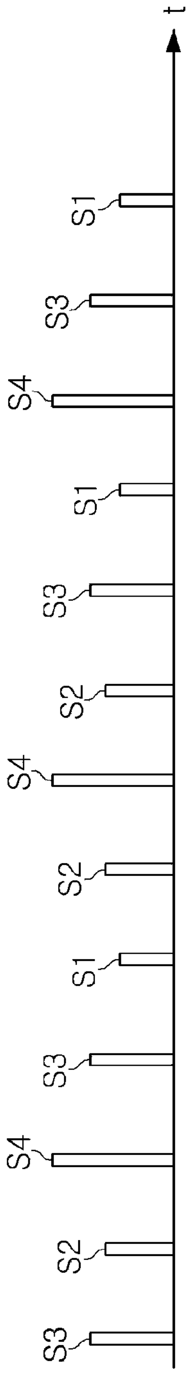
FIGS. 6A and 6B are diagrams illustrating examples of a short beacon or a long beacon output from a non-contact power supply device according to an exemplary embodiment in the present disclosure.
Figure 6B:
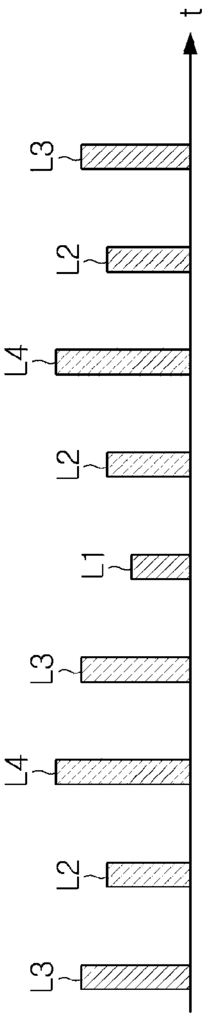

FIGS. 6A and 6B are diagrams illustrating examples of a short beacon or a long beacon output from the power supply device according to exemplary embodiments of the present disclosure.

Referring to FIGS. 6A and 6B, in exemplary embodiments, the signal levels of the short beacon or the long beacon may be randomly varied.

As set forth above, according to exemplary embodiments of the present disclosure, the power receiving device may be properly recognized or the communications circuit of the power receiving device may be woken-up even in the case in which a coupling coefficient between the non-contact power supply device and the power receiving device is low, and power loss may be reduced by outputting a short beacon or a long beacon having a relatively low level in the case in which the coupling coefficient between the non-contact power supply device and the power receiving device is high.

While exemplary embodiments have been shown and described above, it will be apparent to those skilled in the art that modifications and variations could be made without departing from the scope of the present invention as defined by the appended claims.

What is claimed is:

1. A power supply device comprising:

a power transmitting unit configured to control a transmission of a short beacon to recognize a power receiving device, a long beacon for waking-up a communications circuit of the power receiving device, and a charging power in a contactless manner;

a power transmitting coil configured to transmit the short beacon and the charging power in the contactless manner; and a controlling unit configured to perform either one or both of varying signal levels of the transmitted short beacon until the power receiving device is recognized, and varying signal levels of the transmitted long beacon until an advertisement signal is received from the power receiving device.

2. The power supply device of claim 1, wherein the controlling unit is configured to control the signal levels of the transmitted short beacon by controlling a voltage level of input power applied to the power transmitting unit.

3. The power supply device of claim 1, further comprising a detecting unit configured to detect variations in impedance of the power transmitting coil.

4. The power supply device of claim 3, wherein the controlling unit is configured to control the signal levels of the transmitted short beacon according to a detection result from the detecting unit.

5. The power supply device of claim 1, wherein the controlling unit is configured to sequentially increase the signal levels of the transmitted short beacon.

6. The power supply device of claim 5, wherein the controlling unit is configured to sequentially increase the signal levels of the transmitted short beacon from a minimum signal level to a maximum signal level among a plurality of set signal levels.

7. The power supply device of claim 5, wherein the controlling unit is configured to sequentially increase the signal levels of the transmitted short beacon from a signal level corresponding to a signal level when the power receiving device has previously been recognized to a maximum signal level among a plurality of set signal levels.

8. The power supply device of claim 1, wherein the controlling unit is configured to randomly vary the signal levels of the transmitted short beacon.

9. The power supply device of claim 1, wherein:

the power transmitting unit is configured to control the transmission of the transmitted short beacon according to a first period; and the power transmitting unit is configured to control transmission of the transmitted long beacon for waking-up a communications circuit of the power receiving device which is transmitted according to a second period different from the first period.

10. The power supply device of claim 1, wherein the controlling unit is configured to control the signal levels of the transmitted long beacon for waking-up a communications circuit of the power receiving device to be sequentially varied within a set time until the advertisement signal is received from the power receiving device in response to the power receiving device being recognized by the transmission of the transmitted short beacon.

11. A power supply device, comprising:

a power transmitting coil;

a power transmitting unit configured to control the power transmitting coil to transmit a short beacon to recognize a power receiving device, to transmit a long beacon according to a period to wake-up a communications circuit of the power receiving device, and to transmit a charging power in a contactless manner; and a controlling unit configured to increase, until an advertisement signal is received, a signal level of the long beacon in response to the power receiving device being recognized by the transmission of the short beacon.

12. The power supply device of claim 11, wherein the controlling unit is configured to control the signal levels of the long beacon by controlling a voltage level of input power applied to the power transmitting unit.

13. The power supply device of claim 11, wherein the controlling unit is configured to increase of the signal level of the long beacon by sequentially increasing the signal level of the long beacon.

14. The power supply device of claim 13, wherein the controlling unit is configured to increase of the signal level of the long beacon by sequentially increasing the signal level of the long beacon from a minimum signal level to a maximum signal level among a plurality of set signal levels.

15. The power supply device of claim 13, wherein the controlling unit is configured to increase of the signal level of the long beacon by sequentially increasing the signal level of the long beacon from a signal level corresponding to a signal level when the communications circuit of the power receiving device has previously been woken-up to a maximum signal level among a plurality of set signal levels.

16. The power supply device of claim 11, wherein the controlling unit is configured to randomly vary the signal level of the long beacon.

17. The power supply device of claim 11, wherein:

the controlling unit is configured to control transmission of a short beacon for recognizing the power receiving device, and signal levels of the short beacon are fixed.

18. The power supply device of claim 11, wherein the controlling unit is configured to control signal levels of a long beacon in a next period depending on whether the advertisement signal has been received from the power receiving device.

19. A power supply device, comprising:

a power transmitting coil;

a power transmitting unit configured to control the power transmitting coil to transmit a short beacon according to a first period to recognize a power receiving device, to wake up a communications circuit of the power receiving device by transmitting a long beacon according to a second period different from the first period, and to transmit a charging power in a contactless manner; and a controlling unit configured to perform either one or both of varying signal levels of the transmitted short beacon until the power receiving device is recognized, and varying signal levels of the transmitted long beacon until an advertisement signal is received from the power receiving device.

20. The power supply device of claim 19, wherein the controlling unit is configured to control the signal levels of the transmitted short beacon and the signal levels of the transmitted long beacon by controlling a voltage level of input power applied to the power transmitting unit.

21. The power supply device of claim 19, wherein the controlling unit is configured to sequentially increase the signal levels of the transmitted short beacon or the signal levels of the transmitted long beacon.

22. The power supply device of claim 21, wherein the controlling unit is configured to sequentially increase the signal levels of the transmitted short beacon or the signal levels of the transmitted long beacon from a minimum signal level to a maximum signal level among a plurality of set signal levels.

23. The power supply device of claim 21, wherein the controlling unit is configured to sequentially increase the signal levels of the transmitted short beacon from a signal level corresponding to a signal level when the power receiving device has previously been recognized to a maximum signal level among a plurality of set signal levels.

24. The power supply device of claim 21, wherein the controlling unit is configured to sequentially increase the signal levels of the transmitted long beacon from a signal level corresponding to a signal level when the communications circuit of the power receiving device has previously been woken-up to a maximum signal level among a plurality of set signal levels.

25. The power supply device of claim 19, wherein the controlling unit is configured to randomly vary the signal levels of the transmitted short beacon or the signal levels of the transmitted long beacon.

26. The power supply device of claim 19, wherein the controlling unit is configured to control the signal levels of the transmitted long beacon to be sequentially increased within a set time until the advertisement signal is received from the power receiving device in response to the power receiving device being recognized by the transmission of the transmitted short beacon.

27. A non-contact power supply method comprising:

receiving, in a power save state, an advertisement signal from a power receiving device by transmitting a short beacon for recognizing the power receiving device according to a first period;

transmitting, in the power save state, a long beacon for waking-up a communications circuit of the power receiving device according to a second period different from the first period;

performing, in a low power state, communications with the power receiving device; and transmitting, in a power transfer state, the charging power to the power receiving device, wherein signal levels of the short beacon and signal levels of the long beacon are controlled to be varied.

28. The non-contact power supply method of claim 27, further comprising sequentially increasing, in the power save state, the signal levels of the short beacon according to the first period or the signal levels of the long beacon according to the second period.

29. The non-contact power supply method of claim 28, further comprising sequentially increasing, in the power save state, the signal levels of the short beacon or the signal levels of the long beacon from a minimum signal level to a maximum signal level among a plurality of set signal levels.

30. The non-contact power supply method of claim 28, further comprising sequentially increasing, in the power save state, the signal levels of the short beacon from a signal level corresponding to a signal level when the power receiving device has previously been recognized to a maximum signal level among a plurality of set signal levels.

31. The non-contact power supply method of claim 27, further comprising sequentially increasing, in the power save state, the signal levels of the long beacon from a minimum signal level to a maximum signal level among a plurality of set signal levels within a set time until the advertisement signal is received from the power receiving device in response to the power receiving device being recognized after transmitting the short beacon.

32. The non-contact power supply method of claim 27, further comprising randomly varying, in the power save state, the signal levels of the short beacon or the signal levels of the long beacon.

33. The non-contact power supply method of claim 27, further comprising sequentially increasing, in the power save state, the signal levels of the long beacon from a signal level corresponding to a signal level when the communications circuit of the power receiving device has previously been woken-up to a maximum signal level among a plurality of set signal levels.

34. The non-contact power supply method of claim 28, further comprising varying, in the power save state, the signal levels of the short beacon until impedance in a power transmitting side is changed to a predetermined level or more.

35. The non-contact power supply method of claim 28, further comprising controlling, in the power save state, the signal levels of the long beacon depending on whether the advertisement signal has been received from the power receiving device.

* * * * *